Patented Nov. 3, 1953

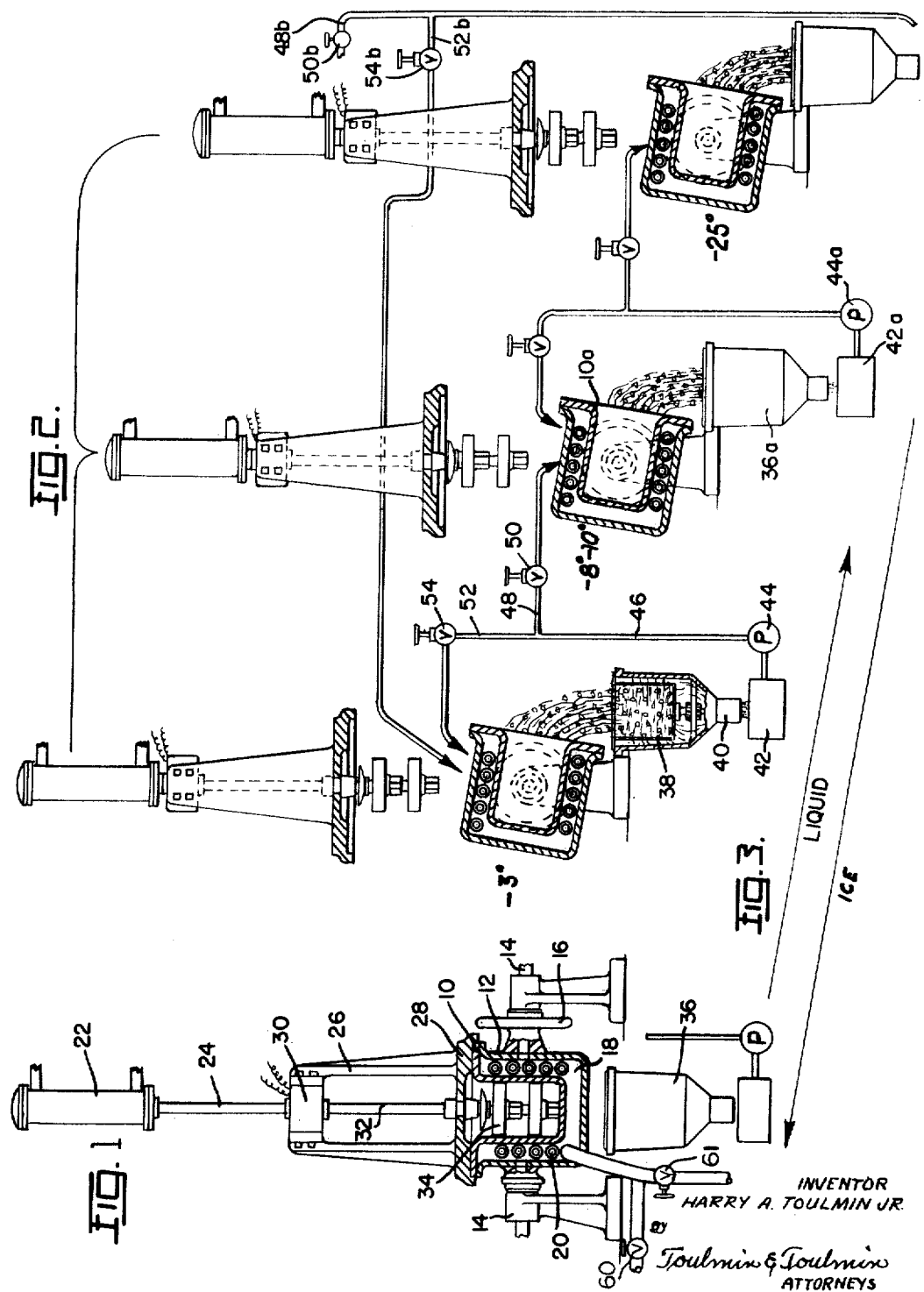

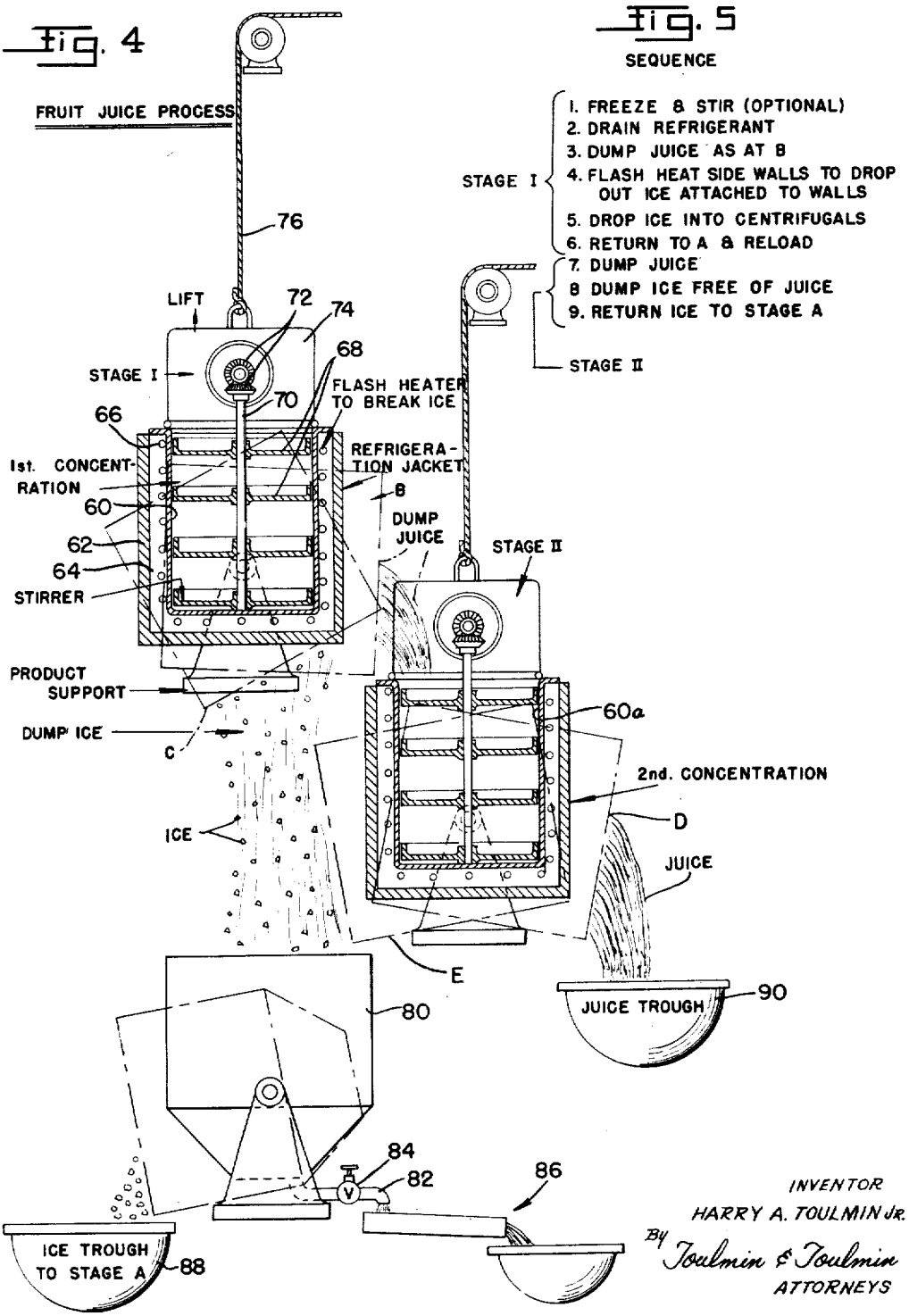

2,657,551

UNITED STATES PATENT OFFICE 2,657,551

METHOD AND APPARATUS FOR DEHYDRATION

Harry A. Toulmin, Jr., Dayton, Ohio, assignor to The Commonwealth Engineering Company of Ohio, Dayton, Ohio, a corporation of Ohio Application January 18, 1950, Serial No. 139,174

12 Claims. (Cl. 62—124)

This invention relates to a method and apparatus for concentrating aqueous substances by the dehydration thereof through a freezing process.

The concentration of fruit and vegetable juices has heretofore generally been accomplished by the application of heat or vacuum or both, in order to bring about evaporation of the water to concentrate the substance to the desired degree. This has the disadvantage of being rather time consuming and, in addition, causes a substantial change in the flavor of the substance, so that when it is reconstituted by the addition of the same amount of water that was removed therefrom, it is much less palatable, and, accordingly, has not met with wide public approval.

The concentration of juices as set forth above is also accompanied by a considerable loss of the vitamin content of the juice, so that it usually has considerably less food value when reconstituted than it had before.

Certain other substances which it may be desired to concentrate contain ingredients which may be injured by the application of heat, either as to actual chemical and physical structure, or as to color or other qualities, and, accordingly, substances of this nature have not heretofore successfully been concentrated by dehydration.

The principal object of the present invention is to provide a method and apparatus for concentrating aqueous substances by dehydration through a freezing process whereby the disadvantages referred to above in connection with prior art processes are substantially completely eliminated.

Another object of this invention is to provide an arrangement whereby very viscous substances can be successfully treated in order to remove the water therefrom.

A still further object is the provision of a method and apparatus for dehydrating substances by freezing, wherein the substance being treated is passed through a plurality of stages so that the number of stages can be increased or decreased to obtain the desired degree of concentration.

These and other objects and advantages will become more apparent upon reference to the following description taken in connection with the accompanying drawings, in which:

Figure 1 is a sectional view through one form which an apparatus according to my invention may take;

Figure 2 is a view showing the apparatus of this invention arranged for concentrating substances according to a three-stage process;

Figure 3 is a flow chart showing the movement through the process of the substance being concentrated and the ice removed therefrom;

Figure 4 is a diagrammatic view of another form which the apparatus according to my invention may take; and Figure 5 is a chart outlining the sequence of operations in connection with the apparatus in Figure 4.

Referring to the drawings, in particular to Figure 1, the arrangement shown therein comprises a tank or container 10 supported in a tiltable carrier 12 mounted on trunnions 14, adapted for being tilted by hand wheel 16. A space 18 is provided between container 10 and supporting means 12, and within this space are coils 20 which are operable for chilling container 10 when receiving a refrigerating medium as controlled by the valve 60.

Vertically disposed over the axis of container 10 is a hydraulic motor 22, including reciprocal ram 24, connected to a yoke 26, which terminates at its lower end in a part 28, adapted for engaging and closing the upper end of container 10. Mounted on yoke 26 is a motor 30 having a shaft 32 extending through part 28, and having thereon an agitator 34 adapted for being positioned within container 10 in order to agitate the contents thereof.

When supporting means 12 is tilted by hand wheel 16, contents of container 10 are delivered to a centrifuge 36 which has a perforated basket 38 therein, which, when rotated at high speed, throws the liquid therefrom while retaining ice therein. The liquid thrown outward from basket 38 passes downwardly through discharge basket 40 into a tank or sump 42 to which is connected a pump 44.

In Figure 2 it will be seen that a three-stage process is set up, and that each of the stages comprises mechanisms substantially identical with that just described in connection with Figure 1.

In Figure 2 the various elements of the apparatus in stage 1 are identified by the same reference numerals as employed in Figure 1, while in stage 2 the same numerals are employed with the addition of a subscript "a," and in stage 3 the same numerals are employed with the addition of a subscript "b."

Pump 44 which draws liquid from stage 1 delivers through a pipe 46 which has one branch pipe 48 leading through valve 50 so as to deliver liquid to container 10a, and another branch pipe 52 leading through valve 54, so that a certain portion of the liquid which pump 44 draws from sump 42 can be refluxed back through stage 1.

Sump 42a associated with stage 2 is similarly connected through its pump 44a so that a portion of the liquid extracted in centrifuge 36a can be refluxed through stage 2 and a portion thereof delivered to stage 3.

The sump of stage 3, not shown, is also connected so that a portion or all thereof can be delivered through pipe 48b and valve 50b to product stage, while another portion can be delivered through pipes 52b and valve 54b back to stage 1.

In operation, the containers 10, 10a, and 10b are adapted for being flash heated by passing a heating medium such as steam through the coil 20, as controlled by the valve 61, or about the outside of the containers, so that after an ice film has formed inside the said containers it can be flashed loose therefrom, and then, when the containers are tilted to the discharge position, all of the ice and liquid therein will be delivered to the associated centrifuge.

In most instances, I have found that it is satisfactory to operate stage 1 at about minus 3 degrees centigrade, stage 2 from about minus 8 to minus 15 degrees centigrade, and stage 3 at about minus 25 degrees centigrade.

It will be understood that the particular temperatures employed will vary with the juices being concentrated and with the number of stages through which it is desired to carry it, and with the ultimate degree of concentration desired, and that the temperatures referred to above are merely examples of one operative process which has been carried out.

It has been mentioned before that the process of this invention is adapted for treating highly viscous substances, and for this purpose the agitator 34 is employed. By utilizing the agitator 34, the substance in the container 10 is kept in motion, and all parts of it are brought into contact with the periphery of the said container so that a freezing action can take place. This materially speeds up the process and insures a high efficiency of ice removal.

It is preferable, in carrying out the process, to convey the ice from each centrifuge to the refrigerated container of the preceding stage. In this manner ice crystals formed in one stage are supplied to the preceding stage and act as nuclei about which larger ice crystals can grow in the substance in the container. This not only further increases the efficiency of the process, but also, by causing the ice to pass through the process in counterflow relation to the flow of the liquid, the ice is always removed from the liquid at the point of least concentration, while the liquid is removed from the process at its point of greatest concentration.

Figure 4 shows a somewhat different arrangement, which operates, however, on substantially the same principles as that described in connection with Figures 1 and 2.

In Figure 4 the first stage of the process is carried out within a tiltable container comprising the inner container 60 and the outer container 62 between which there is a space 64 for supplying refrigerant to chill the inner container.

The flash heater 66 surrounds the inner container and is employed for breaking the ice off the container. Agitator means represented by multiple blades 68 on shaft 70 driven through gear 72 from a power means 74 provide agitating means for keeping the liquid stirred up within the inner container. A lift cable 76 is provided for elevating the agitating means upwardly out of the inner container so that it can be tilted to the position shown in dot-dash lines at "B," where the liquid in the inner container will pour into inner container 60a of the second stage.

According to this process, the container then is tilted to the position indicated by the letter "C," and any remaining liquid therein will flow into the centrifuge 80. At the same time, the ice is loosened within the container by the flash heater and is also discharged into the said centrifuge.

The centrifuge is operative to extract the liquid from the ice and to discharge it into pipe 82 and valve 84 into a collecting means, indicated at 86. The centrifuge is also tiltable so the ice can be discharged into an ice trough 88, when a certain portion is refluxed back through the process.

In stage 2 the same apparatus is employed as is employed in stage 1, except that when it is desired to empty the container in stage 2, it is first tilted rightwardly to the position indicated by the dot-dash lines at "D," so the juice will run therefrom to a juice trough 90. Thereafter, the container of stage 2 is tilted leftwardly to the position indicated by the dot-dash lines at "E," and the ice discharged therefrom after it has been broken up by the action of the flash heater.

The parts of the apparatus employed in stage 2 which correspond to those employed in stage 1 are identified by the same reference numerals with the addition of a subscript "A."

It has been found in practice that the first concentration can advantageously be carried out at from 3 to 10 degrees below zero centigrade, while the second stage can be carried out at from 15 to 25 degrees below zero centigrade, but it will be understood that these temperatures are merely exemplary, and that other temperatures could be employed where the nature of the substance being processed indicated.

Also, while I have shown a two-stage process in Figure 4, it will be understood that as many stages as necessary to effect the desired degree of concentration could be employed under the same principles of operation, and the same advantages would obtain.

By practicing my invention and apparatus of the type illustrated, it is found that juices such as fruit and vegetable juices can be concentrated very rapidly, thereby avoiding deleterious exposure to the atmosphere, the resulting concentrate can be reconstituted to its original dilution by the addition of pure water and have substantially the same flavor of fresh juice, and the value of the reconstituted juice as a food is not impaired because it has substantially the same vitamin content as before it was processed.

It will be understood that I do not wish to be limited to the exact proportions, ratios, and other factors specifically set forth in the foregoing description and the accompanying drawings, but desire to comprehend such changes thereof as may be further desirable to adapt my invention to different conditions and usages.

I claim:

1. In an apparatus for freeze-dehydrating aqueous substances; a tiltably supported container, means for chilling the container to cause ice to form on the walls thereof when the substance to be dehydrated is in the container, a centrifuge positioned to receive at least a portion of the contents of the container, means for tilting said container, and means for flash heating the container to loosen the ice on the walls thereof.

2. In an apparatus for freeze-dehydrating aqueous substances; a tiltably supported container, means for chilling the container to cause ice to form on the walls thereof when the substance to be dehydrated is in the container, a centrifuge positioned to receive at least a portion of the contents of the container, means for tilting said container, means for flash heating the container to loosen the ice on the walls thereof so tilting of the container will discharge its entire contents to the centrifuge, and a movably mounted agitator positioned over the container so as to be movable therein when the container is upright.

3. In an apparatus for freeze-dehydrating aqueous substances; a plurality of tiltably supported containers, a centrifuge for each container positioned to receive the contents therefrom when the respective container is tilted on its support, means for chilling said containers to cause ice to form on the walls thereof when the substance to be treated is in the containers, means for flash heating the containers to release the ice therefrom for discharge to the centrifuges with the liquid in the containers, said centrifuges being operable to separate the ice from the liquid, and a pump for each centrifuge connected to pump the liquid therefrom to another container, whereby the liquid becomes more concentrated by the removal of water therefrom as ice, said containers being chilled to progressively lower temperatures in the direction of movement of the substance therethrough.

4. In an apparatus for freeze-dehydrating; a tiltable container, means for refrigerating the container, a second container positioned beneath and to one side of said tiltable container so as to receive liquids therefrom and including means for tilting said container, a centrifuge positioned beneath the tiltable container, and a flash heater for said tiltable container whereby the said tiltable container can be inverted and the flash heater energized to release ice from the walls of the container to the centrifuge.

5. In an apparatus for freeze-dehydrating; a tiltable container, means for refrigerating the container, an agitator movable into the container from above for agitating substances in the container and retractable to permit tilting of the container, a second container positioned beneath and to one side of said tiltable container so as to receive liquids therefrom and including a centrifuge positioned beneath the tiltable container, and a flash heater for said tiltable container whereby the said tiltable container can be inverted and the flash heater energized to release ice from the walls of the container to the centrifuge.

6. In an apparatus for freeze-dehydrating; a pair of tiltable refrigerated containers for the material being dehydrated, an ice receiver, and a liquid receiver; said containers and receivers being so arranged that tilting of one of the containers will position it to discharge to the other container, and inverting of the one container will position it to discharge to the ice receiver, and tilting of the other container in respective opposite directions will position it to discharge to said liquid receiver and ice receiver, respectively, and means for flash heating the containers to release ice from the walls thereof when positioned to discharge to said ice receiver.

7. In an apparatus for freeze-dehydrating; a pair of tiltable refrigerated containers for the material being dehydrated, an ice receiver, and a liquid receiver; said containers and receivers being so arranged that tilting of one of the containers will position it to discharge to the other container, and inverting of the one container will position it to discharge to the ice receiver, and tilting of the other container in respective opposite directions will position it to discharge to said liquid receiver and ice receiver, respectively, and means for flash heating the containers to release ice from the walls thereof when positioned to discharge to said ice receiver, each of said containers having a retractible agitator suspended from thereover.

8. In an apparatus for freeze-dehydrating; a pair of tiltable refrigerated containers for the material being dehydrated, an ice receiver, and a liquid receiver; said containers and receivers being so arranged that tilting of one of the containers will position it to discharge to the other container, and inverting of the one container will position it to discharge to the ice receiver, and tilting of the other container in respective opposite directions will position it to discharge to said liquid receiver and ice receiver, respectively, and means for flash heating the containers to release ice from the walls thereof when positioned to discharge to said ice receiver, said other container being refrigerated to a lower temperature than said one container.

9. In an apparatus for freeze-dehydrating; a pair of tiltable refrigerated containers for the material being dehydrated, an ice receiver, and a liquid receiver; said containers and receivers being so arranged that tilting of one of the containers will position it to discharge to the other container, and inverting of the one container will position it to discharge to the ice receiver, and tilting of the other container in respective opposite directions will position it to discharge to said liquid receiver and ice receiver, respectively, and means for flash heating the containers to release ice from the walls thereof when positioned to discharge to said ice receiver, said ice receiver comprising means to centrifuge the liquid from the ice received therein.

10. In an apparatus for freeze dehydrating aqueous substances, a container for receiving an aqueous substance for freeze dehydration, refrigeration and heating means operatively connected to said container for respectively refrigerating and heating said chamber, an agitator within said chamber, means connected with said agitator for lifting the same out of said container, means tiltably supporting said container, and a receptacle at one side of said container to receive substances therefrom upon tilting of the container relative to said receptacle, said receptacle being adapted for separating liquids and solids delivered thereto.

11. In an apparatus for freeze dehydrating aqueous substances, a container for receiving an aqueous substance for freeze dehydration, refrigeration and heating means engaging said container for respectively refrigerating and heating said chamber, an agitator within said chamber, means connected with said agitator for lifting the same out of said container, means tiltably supporting said container, and a receptacle at one side of said container to receive substances therefrom upon tilting of the container relative to said receptacle, said receptacle comprising a centrifuge.

12. In an apparatus for freeze dehydrating aqueous substances, a container for receiving an aqueous substance for freeze dehydration, refrigeration and heating means engaging said container for respectively refrigerating and heating said chamber, an agitator within said chamber, means connected with said agitator for lifting the same out of said container, means tiltably supporting said container, a receptacle at one side of said container to receive substances therefrom upon tilting of the container relative to said receptacle, said receptacle comprising a centrifuge, and a circulatory system connected between the centrifuge and said container through which at least a part of the fluid discharged from the centrifuge is returned to said container.

HARRY A. TOULMIN, Jr.

References Cited in the file of this patent

UNITED STATES PATENTS

| Number | Name | Date |
|---|---|---|
| 1,636,890 | Zorn | July 26, 1927 |
| 1,738,275 | Baker | Dec. 3, 1929 |
| 2,006,299 | Kaestner | June 25, 1935 |
| 2,145,775 | Muffly | Jan. 31, 1939 |
| 2,200,982 | Dedlow | May 14, 1940 |
| 2,221,694 | Potter | Nov. 12, 1940 |
| 2,225,669 | Taylor | Dec. 24, 1940 |
| 2,324,869 | Oman | July 20, 1943 |
| 2,337,317 | Eggert | Dec. 21, 1943 |
| 2,389,732 | Kellogg | Nov. 27, 1945 |
| 2,436,218 | Malcolm | Feb. 17, 1948 |
| 2,443,203 | Smith | June 15, 1948 |
| 2,503,395 | Le Boeuf | Apr. 11, 1950 |
| 2,513,254 | Savage | June 27, 1950 |
| 2,545,558 | Russell | Mar. 20, 1951 |
| 2,575,892 | Roberts | Nov. 20, 1951 |